US009110894B2

(12) United States Patent
Zhang

(10) Patent No.: US 9,110,894 B2
(45) Date of Patent: Aug. 18, 2015

(54) SYSTEMS AND METHODS FOR DETERMINING RELATED PLACES

(71) Applicant: YAHOO! INC., Sunnyvale, CA (US)

(72) Inventor: Renhui Zhang, Bellevue, WA (US)

(73) Assignee: YAHOOO! INC., Sunnyvale, CA (US)

( * ) Notice: Subject to any disclaimer, the term of this patent is extended or adjusted under 35 U.S.C. 154(b) by 61 days.

(21) Appl. No.: 13/666,844

(22) Filed: Nov. 1, 2012

(65) Prior Publication Data
US 2013/0159331 A1 Jun. 20, 2013

Related U.S. Application Data

(60) Provisional application No. 61/576,549, filed on Dec. 16, 2011.

(51) Int. Cl.
G06F 17/30 (2006.01)
(52) U.S. Cl.
CPC .......... *G06F 17/30* (2013.01); *G06F 17/30241* (2013.01)
(58) Field of Classification Search
None
See application file for complete search history.

(56) References Cited

U.S. PATENT DOCUMENTS

| 7,984,006 | B2 | | 7/2011 | Price |
| 8,073,461 | B2 | * | 12/2011 | Altman et al. ............. 455/456.1 |
| 8,095,153 | B2 | | 1/2012 | Jenkins et al. |
| 8,108,381 | B2 | | 1/2012 | Eberholst et al. |
| 2007/0005419 | A1 | * | 1/2007 | Horvitz et al. .................. 705/14 |
| 2008/0132251 | A1 | * | 6/2008 | Altman et al. ................ 455/457 |
| 2009/0287687 | A1 | | 11/2009 | Martire et al. |
| 2010/0076968 | A1 | * | 3/2010 | Boyns et al. .................. 707/732 |
| 2010/0153008 | A1 | * | 6/2010 | Schwartz et al. ............. 701/207 |
| 2010/0184416 | A1 | * | 7/2010 | Gupta et al. ................ 455/414.3 |
| 2010/0280920 | A1 | | 11/2010 | Scott et al. |
| 2011/0143775 | A1 | * | 6/2011 | Liu et al. .................... 455/456.3 |
| 2011/0218992 | A1 | * | 9/2011 | Waldman et al. ............. 707/724 |
| 2011/0282798 | A1 | * | 11/2011 | Zheng et al. .................. 705/319 |
| 2012/0102034 | A1 | | 4/2012 | Kim et al. |
| 2012/0109944 | A1 | | 5/2012 | Hao |
| 2013/0226937 | A1 | * | 8/2013 | Moritz et al. ................. 707/748 |

FOREIGN PATENT DOCUMENTS

| KR | 20100066827 A | 6/2010 |
| KR | 20120045549 A | 5/2012 |
| WO | WO2012064278 A1 | 5/2012 |

OTHER PUBLICATIONS

Cleversense; www.thecleversense.com/technology.html; Jul. 9, 2012; 1 page.

* cited by examiner

*Primary Examiner* — Bai D. Vu
(74) *Attorney, Agent, or Firm* — James J. DeCarlo; Greenberg Traurig, LLP

(57) ABSTRACT

Techniques for providing location-based recommendations are described. Some embodiments provide a Location-Based Recommendation System ("LRBS") that provides recommendations regarding physical places based on content items, such as Web pages, user reviews, directory listings, or the like, that describe or otherwise reference those places. In one embodiment, the LBRS is configured to, in response to an indication of a first place, determine one or more other places that are similar to the first place, and then provide indications of the determined places as recommendations to a user or other entity. In another embodiment, the LBRS is configured to, in response to an indication of a user, determine one or more places that may be of interest to the user, and then provide indications of the determined places as recommendations. In some embodiments, the LBRS may determine recommendations based on content vectors associated with places and/or users.

24 Claims, 15 Drawing Sheets

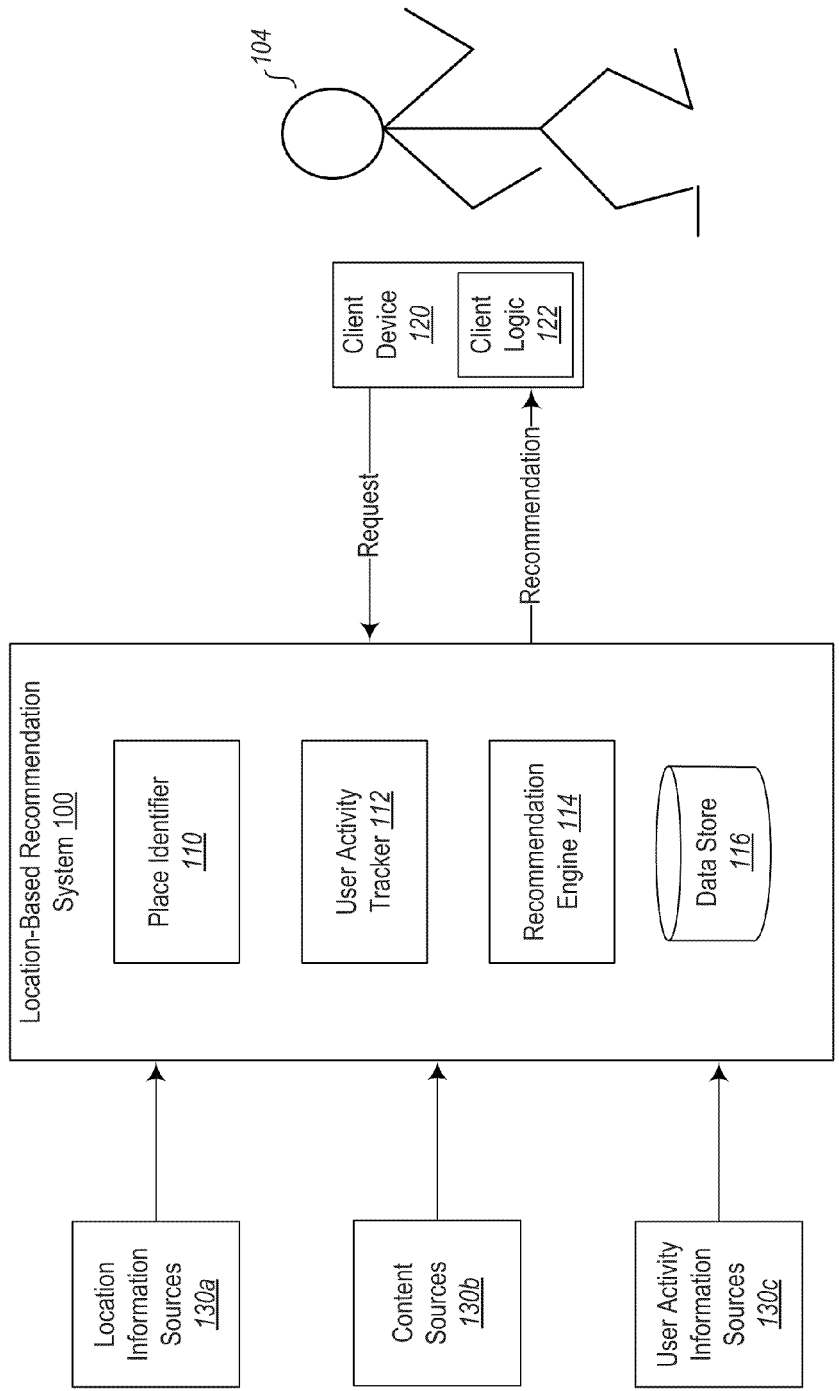

Fig. 3.1
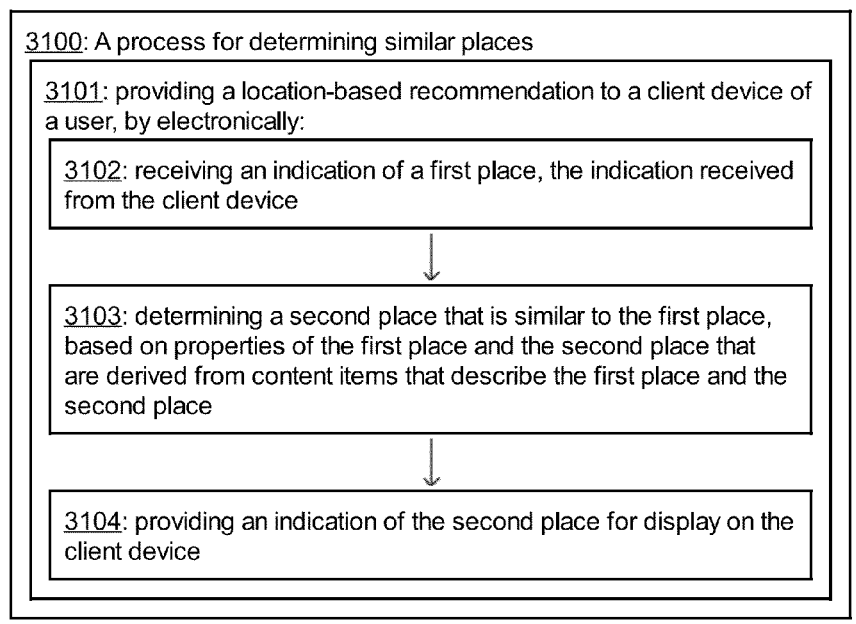
Fig. 3.2
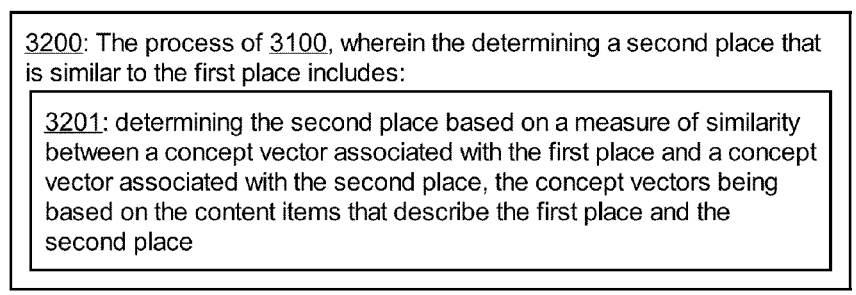

Fig. 3.3
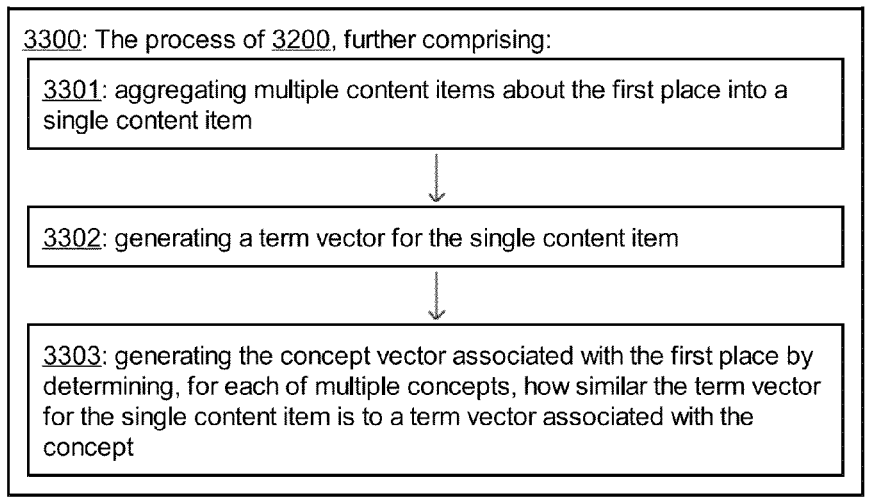
Fig. 3.4
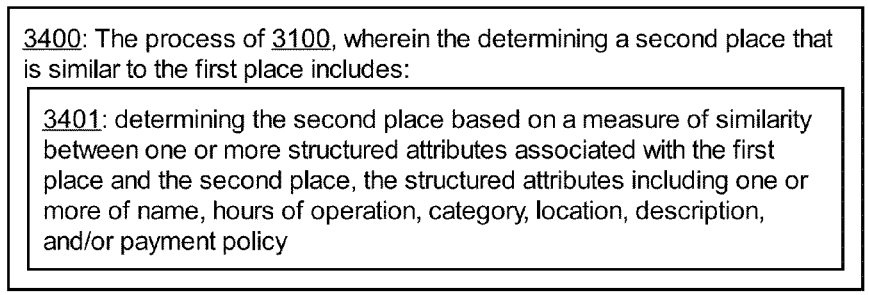

*Fig. 3.5*

3500: The process of 3100, wherein the determining a second place that is similar to the first place includes:

3501: determining multiple places based on a measure of similarity between concept vectors associated with the first place and each of the multiple places, wherein the second place is one of the multiple places

3502: ordering the multiple places based on a combination of distance between a current location of the client device of the user and locations of each of the multiple places, a measure of similarity between a concept vector associated with the first place and concept vectors associated with each of the multiple places, and a measure of similarity between structured attributes associated with the first place and structured attributes associated with the multiple places

Fig. 3.6

3600: The process of 3100, wherein the determining a second place that is similar to the first place includes:

> 3601: determining multiple places based on a measure of similarity between concept vectors associated with the first place and each of the multiple places, wherein the second place is one of the multiple places

> 3602: ordering the multiple places based on a combination of distance between a current location of the client device of the user and locations of each of the multiple places and a measure of similarity between a concept vector associated with each of the multiple places and a user vector associated with the user

Fig. 3.7

3700: The process of 3600, further comprising:

> 3701: determining a user vector for each of multiple users, each user vector based on activities of a corresponding user, the activities including searches, click-throughs, location check-ins, explicit feedback, location tracking, and/or purchase information

*Fig. 3.8*

3800: The process of 3600, wherein the receiving an indication of a first place includes:

3801: adjusting entries in the user vector associated with the user in substantially real time, based on recency and/or frequency of activities performed by the user

*Fig. 3.9*

3900: The process of 3100, wherein the first place and second place each operate under a corresponding brand, and wherein there exists no other place operating under the brand of the first place in a city or state in which the second place is located

*Fig. 3.10*

31000: The process of 3100, wherein the providing a location-based recommendation includes:

31001: providing a location-based recommendation without reference to any social networking information associated with the user

*Fig. 3.11*

31100: The process of 3100, wherein the second place is located in a different city or state than the first place

*Fig. 3.12*

31200: The process of 3100, further comprising:

31201: receiving a query that specifies the first place and requests one or more places that are similar to the first place, wherein the user is located in a city that includes the first place, wherein the query further specifies a city that is remote from a current city of the user, and wherein the second place is located in the remote city

*Fig. 3.13*

31300: The process of 3100, wherein the providing an indication of the second place includes:

31301: providing the indication of the second place as a cross-category recommendation, wherein the first place and the second place are in different service categories but are contextually related

*Fig. 3.14*

31400: The process of 3100, further comprising:

31401: identifying multiple places based on a corpus of content items

31402: deriving properties for each of the multiple locations based on the corpus of content items

Fig. 3.15

31500: The process of 3100, wherein the providing a location-based recommendation includes:

31501: receiving a search query that specifies the first place

31502: providing an indication of the second place as part of search results determined based on the search query, the search results including multiple similar places ordered based on context vectors associated with each of the similar places

*Fig. 3.16*
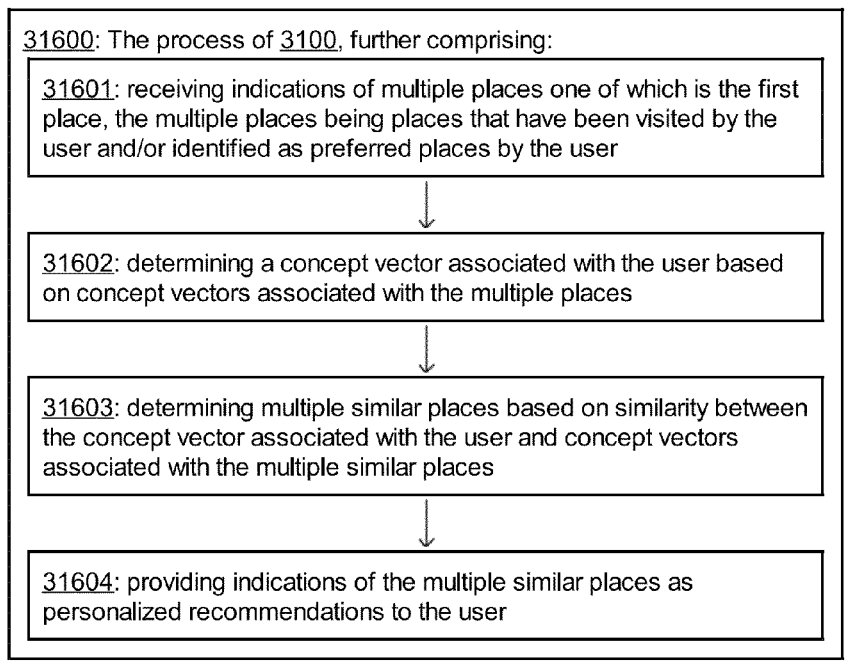
*Fig. 3.17*
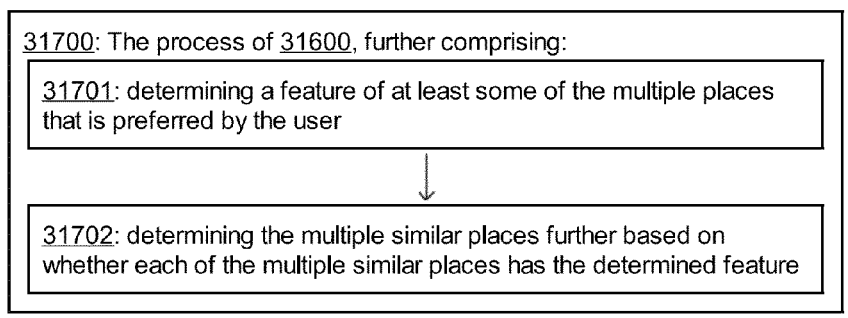

Fig. 3.18
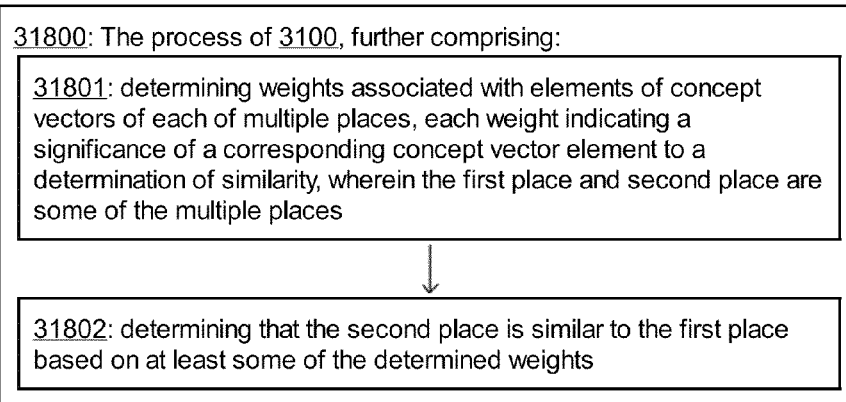
Fig. 3.19
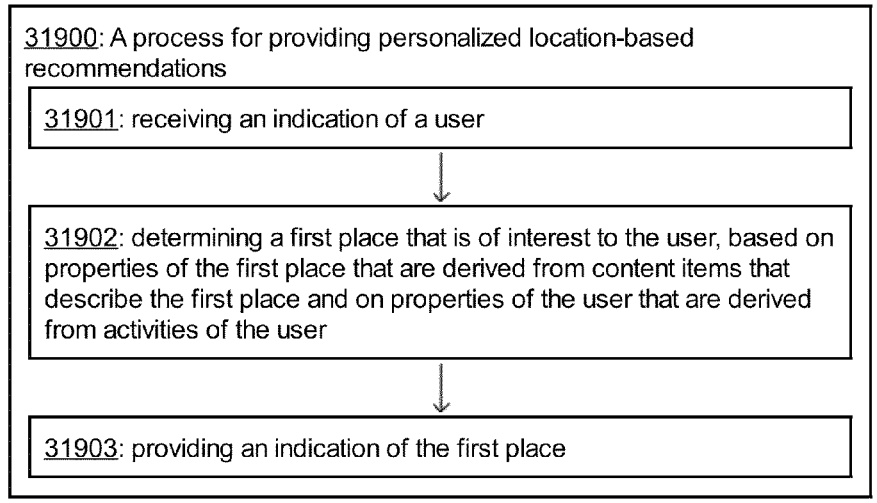

Fig. 3.20

32000: The process of 31900, wherein the first place has a corresponding location and wherein the determining a first place that is of interest to the user includes:

> 32001: determining the first place based on a current location of a mobile device of the user, the location of the first place, and user reviews of the first place

Fig. 3.21

32100: The process of 31900, further comprising:

> 32101: ordering multiple possible places of interest based on a combination of a current location of a mobile device of the user, locations of the multiple places, and user reviews of the multiple places

Fig. 3.22

32200: The process of 31900, wherein the determining a first place that is of interest to the user includes:

> 32201: determining the first place without use of collaborative filtering

Fig. 3.23

32300: The process of 31900, wherein the determining a first place that is of interest to the user includes:

32301: determining the first place without associating the user with a category of users that represents aggregate properties of a group of users who are similar to the user

Fig. 3.24

32400: The process of 31900, further comprising:

32401: determining a user vector for each of multiple users, each user vector based on activities of a corresponding user, the activities including searches, click-throughs, location check-ins, explicit feedback, location tracking, and/or purchase information

Fig. 3.25

32500: The process of 32400, wherein the determining a user vector for each of multiple users includes:

32501: updating the user vector corresponding to one of the multiple users in substantially real time, based on information received about recently occurring user activities and/or based on recency and/or frequency of activities performed by the one user

SYSTEMS AND METHODS FOR DETERMINING RELATED PLACES

TECHNICAL FIELD

The present disclosure relates to methods, techniques, and systems for determining related places and, more particularly, to methods, techniques, and systems for determining and places that are related to one another based on content items that describe those places and/or based on user activity information.

BRIEF DESCRIPTION OF THE DRAWINGS

FIG. 1 is an example block diagram of a location-based recommendation system according to an example embodiment.

FIGS. 3.1-3.25 are example flow diagrams of location-based recommendation processes performed by example embodiments.

DETAILED DESCRIPTION

Figure 2A:
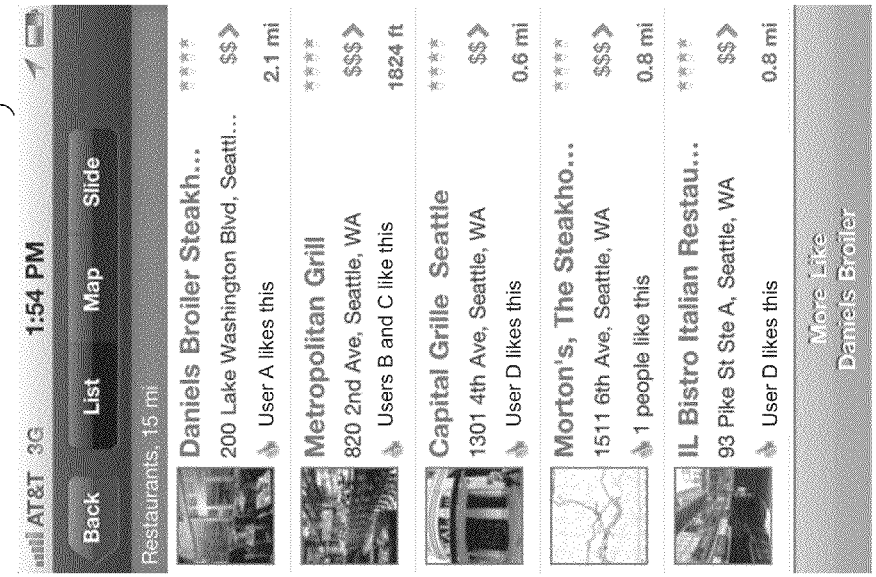
FIGS. 2A-2D are example user interface screens for a client device interacting with a location-based recommendation system according to an example embodiment.

Embodiments described herein provide enhanced computer- and network-based methods and systems for determining related places and, more particularly, determining and providing information about places that are related to one another based on content items that describe those places and/or based on user activity information. Some embodiments provide location-based recommendations and thus provide a Location-Based Recommendation System ("LBRS"). The LBRS may provide recommendations or other information regarding physical places based on content items, such as Web pages, user reviews, directory listings, or the like, that describe or otherwise reference those places. Various types of places may be represented, including dining/drinking establishments (e.g., restaurants, bars, cafes), retail establishments (e.g., clothing stores, supermarkets, boutiques), venues (e.g., clubs, arenas), cultural establishments (e.g., museums, galleries), leisure spaces (e.g., parks, recreation centers), and the like.

In one embodiment, the LBRS is configured to, in response to an indication of a first place, determine one or more other places that are similar or related to the first place, and then provide indications of the determined places as recommendations to a user or other entity. In another embodiment, the LBRS is configured to, in response to an indication of a user, determine one or more places that may be of interest to the user, and then provide indications of the determined places as recommendations.

Although the techniques are primarily described in the context of location-based recommendation, the techniques are equally applicable to, or conceptualized as, a search-related problem or context. For example, some embodiments may receive an indication of a place and determine and output similar places. The determined similar places may be arranged (e.g., filtered, ordered, boosted) based on location and/or other factors. For example, the similar places may be ordered based at least in part on a distance from a user who initiated the search, a distance from the indicated place, or the like. Also, the similar places may be ordered based on information about a user (e.g., determined automatically based on user activity and/or based on user-specified preferences), such as the user's location, likes, dislikes, purchase history, travel history, or the like.

1. Location-Based Recommendation System Overview

FIG. 1 is an example block diagram of a Location-Based Recommendation System according to an example embodiment. In particular, FIG. 1 shows a Location-Based Recommendation System ("LBRS") 100 that includes a place identifier 110, a user activity tracker 112, a recommendation engine 114, and a data store 116. The LBRS 100 is shown interacting with a user 104 operating a client device 120 that includes client logic 122.

The LBRS 100 also interacts with information sources 130, including location information sources 130a, content sources 130b, and user activity information sources 130c. More particularly, the place identifier 110 may process information obtained from the location information sources 130a and/or content sources 130b in order to identify places and to record identified places in the data store 116. The location information sources 130a may include directory listings that can be used to associate a place name with a place address. The location information sources 130a may also or instead include geo-location services that can be used to associated physical coordinates (e.g., latitude and longitude) with a place. The content sources 130b may include Web pages that describe or reference places, including user reviews/ratings, editorial reviews, advertisements, marketing information, or the like.

In one embodiment, the place identifier 110 electronically represents identified places in the data store 116 by generating, updating, and/or recording a data structure or other record. The generated data may include structured properties/attributes, including name, contact information (e.g., address, telephone number, email address), category (e.g., type of food served, type of entertainment), hours of operation, payment policy, and the like.

The generated data may also or instead include a representation in a multi-dimensional feature space, such as a term or concept space. For example, the place identifier 110 may prepare a concept vector that represents a place as a point in a multi-dimensional concept space that has been automatically or manually generated. A concept space may be generated manually by developing a user-generated ontology. A concept space may be generated automatically by processing a knowledge base represented by a corpus of content items, such as by processing Wikipedia and associating a concept with each of at least some Wikipedia pages.

In some embodiments, documents and other content items about a particular place are aggregated as a single document. The single document is then processed semantically to analyze terms and frequency of the document that describe the place. The terms and frequency are then projected to a high-dimensional concept space to build a concept vector. A concept vector for a particular place may thus represent, for each concept in the ontology, how strongly that concept is expressed in or by the place. In some embodiments, a concept vector for a particular space (having an associated document that is the aggregation of content items about the place) document may include, for each concept in the ontology, the cosine distance, Euclidian distance, or some other distance measure between a term vector of the aggregated document and a term vector of the concept (e.g., as determined by the content item(s) in the Wikipedia or other corpus from which the concept was derived). Term vectors may be absolute term frequency counts, normalized term frequency counts, or some other information retrieval metric, such as term frequency—inverse document frequency ("TF-IDF").

As a simple example, limited to the dining/food space, an embodiment may have identified the concepts casual dining, formal dining, Asian food, European food, and American food. A concept vector for a place may thus be represented as:

v=[Casual, Formal, Asian, European, American, Mexican]

In the concept space of the above example, concept vectors for four example establishments may include:

vp1=[0, 1.0, 0, 1.0, 0.5, 0]
vp2=[0.8, 0.2, 0, 0.5, 1.0, 0]
vp3=[0, 1.0, 0.6, 0.3, 0.3, 0]
vp4=[1.0, 0, 0.5, 0, 0, 0.5]

Concept vector vp1 represents a formal restaurant that serves primarily European (e.g., French or Italian) themed meals, but may also include food that would be considered American (e.g., high-end steaks). Concept vector vp2 represents a casual restaurant (e.g., with tables but no wait service) that specializes in American food (e.g., hamburgers) but also serves some European items (e.g., pasta dishes). Concept vector vp3 represents a high-end fusion restaurant that takes inspiration from Asian, American, and European cuisines, but focuses more heavily on Asian-themed menu items. Concept vector vp4 represents highly casual mobile food truck (e.g., no tables, no wait service) that serves Asian-themed tacos, thus having an expression in both Asian and Mexican cuisine.

The user activity tracker 112 tracks activities of the user 104. Tracked activities may include Web history information (e.g., searches, click-throughs, ratings), physical location history information, purchase history information, or the like. In some embodiments, the user activity tracker 112 may use the tracked activities to determine user preferences. For example, a search for a particular term (e.g., "soul food") may indicate that the user 104 is at least weakly interested in soul food. A visit by the user 104 to a soul food restaurant may indicate that the user 104 is strongly interested in soul food. Tracked activities may also or instead include information retrieved from sensors (e.g., GPS receivers, microphones) of mobile devices and/or user interactions with or by mobile devices.

The user activity tracker 112 may in some embodiments electronically represent the user 104 in the data store 116 by generating, updating, and/or recording a data structure or other record. The generated data may include structured attributes, such as identity information, current location, or the like. The generated data may also or instead include a vector (a "user vector") that represents interests or preferences of the user 104, based on the user's activities. For example, if the user 104 frequently visits restaurants that serve Chinese food and modern art galleries, the vector may represent a strong affinity to Chinese food restaurants and modern art galleries, possibly in addition to a general affinity for various related concepts including restaurants, Chinese culture, museums, art studios, and the like. A user vector may be constructed from processing user activity inputs. Frequency, recency and signal strength may be taken into account when building out the user vector. Concepts associated with places are aggregated with different weights from frequency, recency and signal strength to construct the user vector. For example, a user that shops at Whole Foods (a grocery store that sells organic food) and likes Organic Table restaurant (a restaurant that prepares organic dishes), would have a very high weight on the Organic, Healthy Living concepts in its user vector.

The recommendation engine 114 provides recommendations or other information about places. In the illustrated embodiment, the user 104 utilizes the client device 120 to form a request that is transmitted to the recommendation engine 114. In response, the recommendation engine determines one or more recommended places and transmits indications of the recommended places as a recommendation to the client device 120. As described further below, the recommendation engine 114 may provide, in response to a request that includes an indication of a first place, one or more other places that are similar or related to the first place. As also described below, the recommendation engine 114 may provide, in response to a request that includes an indication of the user 104, one or more places that may be of interest to the user 104.

The client device 120 may be any type of computing system or device that can interact with the LBRS 100. Example devices include mobile devices (e.g., smart phones, feature phones, mobile phones, laptops, tablets), desktop computers, kiosk systems, and the like. The client device 120 includes logic 122 that is configured to interact with the LBRS 100, including a mobile device application ("an app"), a Web browser, or the like.

FIGS. 2A-2D are example user interface screens for a client device interacting with a location-based recommendation system according to an example embodiment. FIGS. 2A-2D depict user interface screens, such as may be displayed on the mobile device 120 as part of an app or other client logic.

Figure 2B:
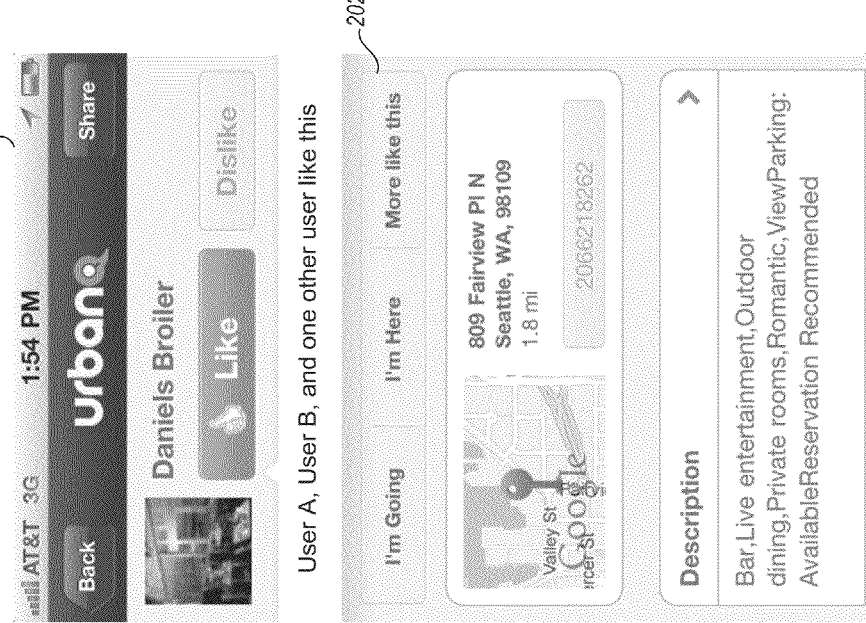

FIGS. 2A and 2B illustrate similar location recommendation according to one embodiment. More particularly, FIG. 2A depicts a screen 200 that displays information about a place. In this example, the place is restaurant named "Daniels Broiler." Daniels Broiler is a higher-end, steak and grill-oriented restaurant. The displayed screen 200 includes a control (e.g., button) 202 that, when selected by the user, causes the LBRS 100 to determine places that are similar or related to Daniels Broiler.

FIG. 2B depicts a screen 210 that displays recommended places determined in response to a user selection of control 202 in FIG. 2A. The screen 210 includes indications of recommended other restaurants, including the Metropolitan Grill, the Capital Grille, Morton's Steakhouse, and the like. The depicted recommendations are all similar to Daniels Broiler. In particular, each of the recommended places is a higher-end restaurant that serves at least some food that is similar to that prepared by Daniels Broiler.

Figure 2C:
Figure 2D:

FIGS. 2C and 2D illustrate location recommendation that also considers user information according to one embodiment. More particularly, FIG. 2C depicts a screen 220 that is displaying information about various restaurants that are in the vicinity of the user. The restaurants are ordered by distance, from near to far. The screen 220 also includes a control 222 that, when selected by the user, causes the LBRS 100 to determine places of interest for the user, based at least in part on learned user preferences. In this example, the user has a preference for higher-end restaurants, and particularly those that serve Asian food (e.g., Chinese, Japanese, Thai).

FIG. 2D depicts a screen 230 that displays recommended places determined in response to a user selection of control 222 in FIG. 2C. The screen 230 includes indications of other restaurants, including the Umi Sushi, Daniels Broiler, Il Bistro, Seastar Restaurant, and the Metropolitan Grill. In this case, the restaurants are ordered by the likelihood that the user would favor a restaurant that is located within a reasonable distance (e.g., 1 mile, 15 minute travel time). The depicted recommendations are appropriate for the user as they are each a higher-end restaurant, as preferred by the user. In addition, some of the recommendations (e.g., Umi Sushi and Seastar) serve at least some Asian-themed food.

Some embodiments combine information about users and places. For example, one embodiment may order places (e.g., provided in response to a query) based on multiple factors, including distance between the user and each place, similarity between places, similarity between the user and a place, and the like. As discussed elsewhere herein, similarity may be based on various factors, including similarity between concept vectors that are associated with places and the user, similarity between structured attributes associated with places and/or users, and the like.

Note that although specific user interfaces have been described above, other embodiments may expose functionality of the LBRS 100 in other ways. For example, the control 222 may also or instead by presented in other contexts, such as on a home screen or other portion of an interface. Also, different user interface controls (e.g., links, menus) may be employed to achieve the same or similar effect.

In addition, the techniques are not limited to the mobile environment. For example, at least some of the techniques may be employed in the context of a trip planning application accessible by any type of client (e.g., desktop browsers) so that users can discover potential places of interest prior to or during travel.

2. Example Processes

FIGS. 3.1-3.25 are example flow diagrams of location-based recommendation processes performed by example embodiments.

FIG. 3.1 is an example flow diagram of example logic for determining similar places. The illustrated logic in this and the following flow diagrams may be performed by, for example, the Location-Based Recommendation System 100 and/or the client device 120 described with respect to FIG. 1, above. More particularly, FIG. 3.1 illustrates a process 3100 that includes operations performed by or at the following block(s).

At block 3101, the process performs providing a location-based recommendation to a client device of a user, by electronically: performing operation(s) of block(s) 3102, 3103 and 3104, described below. Providing a location-based recommendation may be performed as part of a recommendation system that is configured to make recommendations to users based information about places and/or the users. In other embodiments, a location-based recommendation may instead or also be a search result returned in response to a query that requests one or more places similar to an indicated place.

At block 3102, the process performs receiving an indication of a first place, the indication received from the client device. The place may include a place or location having a physical extent, such as a food or drink service establishment (e.g., restaurant, coffee shop), a cultural establishment (e.g., museum, gallery), an outdoor establishment (e.g., a park), or the like. The place may be identified in various ways, such as by GPS coordinate, name, address, or the like. In some embodiments, the process may be customized to provide interest-specific recommendations, such as for dining, entertainment, sports, outdoor enthusiasts (e.g., hiking, biking, climbing), or the like.

At block 3103, the process performs determining a second place that is similar to the first place, based on properties of the first place and the second place that are derived from content items that describe the first place and the second place. In some embodiments, properties may be structured properties/attributes, such as hours of operation, establishment type, street address, or the like. In some embodiments, the properties may instead or in addition be a vector or other representation of the place in a multi-dimensional space, including concept space (e.g., a concept vector), term space (e.g., a keyterm vector), or the like. A concept vector may be derived by determining how similar the place is to each of multiple concepts of a manually or automatically generated ontology/taxonomy. As a general matter, the process may use content items (e.g., online review, directory listings, marketing information, geo-location information) that are obtained by crawling the Web and/or other public or private sources of content items.

At block 3104, the process performs providing an indication of the second place for display on the client device. In some embodiments, an indication of the second place may be provided by causing information about the second place (e.g., name, address, rating) to be displayed, such as on a screen of a client device.

FIG. 3.2 is an example flow diagram of example logic illustrating an example embodiment of process 3100 of FIG. 3.1. More particularly, FIG. 3.2 illustrates a process 3200 that includes the process 3100, wherein the determining a second place that is similar to the first place includes operations performed by or at one or more of the following block(s).

At block 3201, the process performs determining the second place based on a measure of similarity between a concept vector associated with the first place and a concept vector associated with the second place, the concept vectors being based on the content items that describe the first place and the second place. As noted, a concept vector may be used to represent a place in a multi-dimensional concept space comprising multiple concepts. The concept vectors for the first place and the second place may represent how similar each of the places are to each of at least some of the concepts in the concept space, so that the vectors for the two places can be compared. Comparing vectors may include determining a measure of similarity, such as by computing the cosine distance between two vectors.

FIG. 3.3 is an example flow diagram of example logic illustrating an example embodiment of process 3200 of FIG. 3.2. More particularly, FIG. 3.3 illustrates a process 3300 that includes the process 3200, and which further includes operations performed by or at the following block(s).

At block 3301, the process performs aggregating multiple content items about the first place into a single content item. The process may search for and identify multiple content items (e.g., user/editorial reviews, marketing pages, company Web pages) that are about the first place.

At block 3302, the process performs generating a term vector for the single content item. The process may then process the aggregated content item to generate a term vector, which may include absolute or normalized frequency counts, term frequency-inverse document frequencies, or some other term count measure.

At block 3303, the process performs generating the concept vector associated with the first place by determining, for each of multiple concepts, how similar the term vector for the single content item is to a term vector associated with the concept. The process may then generate the concept vector, where the generated concept vector includes an entry for each of multiple concepts. Each entry in the concept vector reflects the similarity between the term vector for the first place (generated as above) and a corresponding term vector associated with the concept. The term vector associated with the concept can be determined in various ways, such as by processing content items that are identified as being about or related to the concept (e.g., by human curation, Wikipedia pages, encyclopedia pages, knowledge bases, or the like).

FIG. 3.4 is an example flow diagram of example logic illustrating an example embodiment of process 3100 of FIG. 3.1. More particularly, FIG. 3.4 illustrates a process 3400 that includes the process 3100, wherein the determining a second place that is similar to the first place includes operations performed by or at one or more of the following block(s).

At block 3401, the process performs determining the second place based on a measure of similarity between one or more structured attributes associated with the first place and the second place, the structured attributes including one or more of name, hours of operation, category, location, description, and/or payment policy. As noted, the process may also or instead compare structured attributes. Determining a measure of similarity between structured attributes may include exact or approximate (e.g., substring, containment, relational) matching between attributes.

FIG. 3.5 is an example flow diagram of example logic illustrating an example embodiment of process 3100 of FIG. 3.1. More particularly, FIG. 3.5 illustrates a process 3500 that includes the process 3100, wherein the determining a second place that is similar to the first place includes operations performed by or at one or more of the following block(s).

At block 3501, the process performs determining multiple places based on a measure of similarity between concept vectors associated with the first place and each of the multiple places, wherein the second place is one of the multiple places. In some embodiments, the process determines multiple places that are similar to the first place, such as by identifying places that have a concept vector that is similar to a concept vector associated with the first place.

At block 3502, the process performs ordering the multiple places based on a combination of distance between a current location of the client device of the user and locations of each of the multiple places, a measure of similarity between a concept vector associated with the first place and concept vectors associated with each of the multiple places, and a measure of similarity between structured attributes associated with the first place and structured attributes associated with the multiple places. The process may then order or rank the determined multiple places based on various factors, including (1) how close the places are to the current location of the user's mobile device, (2) how similar, based on context vectors, each of the multiple places is to the first place, and (3) how similar, based on structured attributes, each of the multiple places is to the first place. Example structured attributes are described above.

FIG. 3.6 is an example flow diagram of example logic illustrating an example embodiment of process 3100 of FIG. 3.1. More particularly, FIG. 3.6 illustrates a process 3600 that includes the process 3100, wherein the determining a second place that is similar to the first place includes operations performed by or at one or more of the following block(s).

At block 3601, the process performs determining multiple places based on a measure of similarity between concept vectors associated with the first place and each of the multiple places, wherein the second place is one of the multiple places. In some embodiments, the process determines multiple places that are similar to the first place, such as by identifying places that have a concept vector that is similar to a concept vector associated with the first place.

At block 3602, the process performs ordering the multiple places based on a combination of distance between a current location of the client device of the user and locations of each of the multiple places and a measure of similarity between a concept vector associated with each of the multiple places and a user vector associated with the user. The process may then order or rank the determined multiple places based on various factors, including how close the places are to the current location of the user's mobile device and how similar each of the multiple places is to the user. Similarity between a user and place may be determined based on a user vector generated based on activities of the user, including search history, explicit feedback, travel history, purchase history, and the like.

FIG. 3.7 is an example flow diagram of example logic illustrating an example embodiment of process 3600 of FIG. 3.6. More particularly, FIG. 3.7 illustrates a process 3700 that includes the process 3600, and which further includes operations performed by or at the following block(s).

At block 3701, the process performs determining a user vector for each of multiple users, each user vector based on activities of a corresponding user, the activities including searches, click-throughs, location check-ins, explicit feedback, location tracking, and/or purchase information. The user vector may represent the user as a location in a multi-dimensional concept space, based on various user activities that indicate a level of interest in a particular place, item, or the like. For example, a search for a topic may indicate a (low) level of interest in the topic. A click-through on a search result may indicate a higher interest in a topic. Explicit feedback (e.g., a like or dislike or star rating) may indicate an even higher level of interest, while a physical visit or purchase may indicate the highest level of interest.

FIG. 3.8 is an example flow diagram of example logic illustrating an example embodiment of process 3600 of FIG. 3.6. More particularly, FIG. 3.8 illustrates a process 3800 that includes the process 3600, wherein the receiving an indication of a first place includes operations performed by or at one or more of the following block(s).

At block 3801, the process performs adjusting entries in the user vector associated with the user in substantially real time, based on recency and/or frequency of activities performed by the user. In some embodiments, entries or elements of the user vector or other data representation may be emphasized or decayed based on the age of the activity and/or how frequently the activity occurs. Substantially real time update may include on-demand update (e.g., in response to the processing of a query that uses user information to make a determination), frequent (e.g., every 15 minutes or less) batch updates to user information, or the like.

FIG. 3.9 is an example flow diagram of example logic illustrating an example embodiment of process 3100 of FIG. 3.1. More particularly, FIG. 3.9 illustrates a process 3900 that includes the process 3100, wherein the first place and second place each operate under a corresponding brand, and wherein there exists no other place operating under the brand of the first place in a city or state in which the second place is located. The process may be configured to identify places operating under distinct brands, but that are nonetheless similar to one another (e.g., because they sell the same or similar type of food). Note that the process may not actually utilize a brand or other structured identifier to determine similar places. In particular, the process may advantageously determine similar places even though the similar places do not have an identical or even overlapping brand, identity, category, or the like. Note further that the process may also be able to distinguish between places despite having the same brand or name. In particular, because the process can make determinations based on reviews and other content items, it can determine that two restaurants that have the same name are actually quite different from one another.

FIG. 3.10 is an example flow diagram of example logic illustrating an example embodiment of process 3100 of FIG. 3.1. More particularly, FIG. 3.10 illustrates a process 31000 that includes the process 3100, wherein the providing a location-based recommendation includes operations performed by or at one or more of the following block(s).

At block 31001, the process performs providing a location-based recommendation without reference to any social networking information associated with the user. In some embodiments, the process does not utilize any social networking information, such as information about what the user's friends or other social network members/relations think about particular places, based on likes, dislikes, reviews, or the like. The process can thus advantageously recommend places in locations where the user has no friends, and thus there may be limited or no social networking information available about places at or in those locations. Of course, in other embodiments, the process may instead utilize such social networking information, possibly in conjunction with other techniques described herein.

FIG. 3.11 is an example flow diagram of example logic illustrating an example embodiment of process 3100 of FIG. 3.1. More particularly, FIG. 3.11 illustrates a process 31100 that includes the process 3100, wherein the second place is located in a different city or state than the first place. Note that the process may not use a city or state as a unit of processing. In particular, the process may instead use geographic proximity based on distance and possibly other factors (e.g., traffic, terrain) in lieu of political boundaries. However, the process may still advantageously determine similar locations that are remote from one another, because the process can in some embodiments determine similarities based on whether two places are related (or near each other) in a concept space.

FIG. 3.12 is an example flow diagram of example logic illustrating an example embodiment of process 3100 of FIG. 3.1. More particularly, FIG. 3.12 illustrates a process 31200 that includes the process 3100, and which further includes operations performed by or at the following block(s).

At block 31201, the process performs receiving a query that specifies the first place and requests one or more places that are similar to the first place, wherein the user is located in a city that includes the first place, wherein the query further specifies a city that is remote from a current city of the user, and wherein the second place is located in the remote city. In some embodiments, such a query may be generated when a user is browsing a current place on a client device, and indicates that she would like information about other places that are like the current place. When a user is or is about to travel, the user may want to obtain information about places at the destination that are similar to his favorite or preferred places at home. The process is capable of recommending places that are remote from each other and that are not of the same brand. In particular, because the process may measure similarity based on concept vectors it may identify places that are conceptually similar to one another, even though they do not have identical structural attributes, such as brand, category, or the like.

FIG. 3.13 is an example flow diagram of example logic illustrating an example embodiment of process 3100 of FIG. 3.1. More particularly, FIG. 3.13 illustrates a process 31300 that includes the process 3100, wherein the providing an indication of the second place includes operations performed by or at one or more of the following block(s).

At block 31301, the process performs providing the indication of the second place as a cross-category recommendation, wherein the first place and the second place are in different service categories but are contextually related. The process may recommend two places that are similar to one another even though they are different types or categories of establishments. In some embodiments, the first place and the second place may be in different service categories, in that the primary service (e.g., food service, retail, financial service) performed by each of the places is different. For example, the first place may be an organic restaurant and the second place may be an organic grocery store. Even though these places are different service categories (e.g., food service versus retail), they are still related because of their shared focus on organic foods.

FIG. 3.14 is an example flow diagram of example logic illustrating an example embodiment of process 3100 of FIG. 3.1. More particularly, FIG. 3.14 illustrates a process 31400 that includes the process 3100, and which further includes operations performed by or at the following block(s).

At block 31401, the process performs identifying multiple places based on a corpus of content items. In some embodiments, the process periodically process a corpus of content items (e.g., obtained from the Web and/or other private/public information sources) in order to identify places.

At block 31402, the process performs deriving properties for each of the multiple locations based on the corpus of content items. The process may derive (and store) information about the identified locations, such as by generating concept vectors, keyterm vectors, structured attributes, or the like. In some embodiments, multiple content items about an identified place are aggregated into a single content item. Then, a concept vector for the place is determined for the identified place based on the aggregated content item.

FIG. 3.15 is an example flow diagram of example logic illustrating an example embodiment of process 3100 of FIG. 3.1. More particularly, FIG. 3.15 illustrates a process 31500 that includes the process 3100, wherein the providing a location-based recommendation includes operations performed by or at one or more of the following block(s).

At block 31501, the process performs receiving a search query that specifies the first place. Some embodiments may provide a search facility that receives an indication of the first place and determined one or more similar places based on the described techniques.

At block 31502, the process performs providing an indication of the second place as part of search results determined based on the search query, the search results including multiple similar places ordered based on context vectors associated with each of the similar places. The second place may be one of multiple similar places determined based on the described techniques. The multiple similar places may be ordered based on context vector similarity and returned as search results.

FIG. 3.16 is an example flow diagram of example logic illustrating an example embodiment of process 3100 of FIG. 3.1. More particularly, FIG. 3.16 illustrates a process 31600 that includes the process 3100, and which further includes operations performed by or at the following block(s).

At block 31601, the process performs receiving indications of multiple places one of which is the first place, the multiple places being places that have been visited by the user and/or identified as preferred places by the user. One embodiment provides personalized recommendations based on multiple places of interest to the user. These places are typically those that have been visited or expressly indicated by the user as preferred (e.g., liked) places.

At block 31602, the process performs determining a concept vector associated with the user based on concept vectors associated with the multiple places. Having received indications of the places of interest, the process determines a user concept vector based on the concept vectors associated with the places of interest (e.g., based on average of the place-based concept vectors, possibly weighted based on age, strength of preference, or the like).

At block 31603, the process performs determining multiple similar places based on similarity between the concept vector associated with the user and concept vectors associated with the multiple similar places. Having determined the user concept vector, the process determined multiple additional places that are similar thereto.

At block 31604, the process performs providing indications of the multiple similar places as personalized recommendations to the user. Having determined the multiple similar places, the process can provide (e.g., transmit, send) indications thereof as a personalized recommendation.

FIG. 3.17 is an example flow diagram of example logic illustrating an example embodiment of process 31600 of FIG. 3.16. More particularly, FIG. 3.17 illustrates a process 31700 that includes the process 31600, and which further includes operations performed by or at the following block(s).

At block 31701, the process performs determining a feature of at least some of the multiple places that is preferred by the user. The determined feature may some quality or characteristic that is shared by each of the multiple places visited by the user. For example, the feature may be a certain type of food (e.g., Asian, Mexican, American, spicy), a certain price level (e.g., cheap, expensive), a certain type of venue (e.g., rock, jazz, opera), or the like. The feature may be expressed by way of a structured attribute or as a component or element of a concept vector. In some embodiments, the process may determine the feature by determining a correlation (or lack thereof) between the feature and the behavior of the user, such as the locations visited by the user or otherwise indicated as being of interest to the user. multiple places (or some subset) that is strongly correlated with the.

At block 31702, the process performs determining the multiple similar places further based on whether each of the multiple similar places has the determined feature. Determining whether a place has the determined feature may be performed as part of a vector comparison. For example, if the user vector strongly expresses that the user prefers spicy food, the user vector will be determined as being similar to concept vectors associated with restaurants that serve Mexican, Szechuan, or other cuisines associated with spicy dishes, because those concept vectors will also strongly express the feature of spicy food.

FIG. 3.18 is an example flow diagram of example logic illustrating an example embodiment of process 3100 of FIG. 3.1. More particularly, FIG. 3.18 illustrates a process 31800 that includes the process 3100, and which further includes operations performed by or at the following block(s).

At block 31801, the process performs determining weights associated with elements of concept vectors of each of multiple places, each weight indicating a significance of a corresponding concept vector element to a determination of similarity, wherein the first place and second place are some of the multiple places. The weights may be based on a set of training data, such as may be obtained based on user interaction, user feedback, or other user behaviors. The weights may indicate how relevant a particular feature of a place is when determining whether that place is similar to another place. For example, by processing training data, it may be observed that price is a significant factor, whereas the availability of parking is not.

At block 31802, the process performs determining that the second place is similar to the first place based on at least some of the determined weights. Continuing the above example, when determining similarity between two places, the similarity in price (e.g., whether the two restaurants are cheap or expensive) may be weighted more heavily than any similarity in parking between the two restaurants.

FIG. 3.19 is an example flow diagram of example logic for providing personalized location-based recommendations. More particularly, FIG. 3.19 illustrates a process 31900 that includes operations performed by or at the following block(s).

At block 31901, the process performs receiving an indication of a user. The received identifier may be a user ID, user name, or any information sufficient to look up or obtain user information that may be used to provide a personalized recommendation to the user.

At block 31902, the process performs determining a first place that is of interest to the user, based on properties of the first place that are derived from content items that describe the first place and on properties of the user that are derived from activities of the user. In some embodiments, properties of the place may be structured properties/attributes, such as hours of operation, establishment type, street address, or the like. In some embodiments, the properties of the place may instead or in addition be a vector or other representation of the place in a multi-dimensional space, including concept space (e.g., a concept vector), term space (e.g., a keyterm vector), or the like. Properties of the user may be based on activities of the user, including travel history, Web history (e.g., searches, click-throughs), purchase history, or the like.

At block 31903, the process performs providing an indication of the first place. In some embodiments, an indication of the first place may be provided by causing information about the first place (e.g., name, address, rating) to be displayed.

FIG. 3.20 is an example flow diagram of example logic illustrating an example embodiment of process 31900 of FIG. 3.19. More particularly, FIG. 3.20 illustrates a process 32000 that includes the process 31900, wherein the first place has a corresponding location and wherein the determining a first place that is of interest to the user includes operations performed by or at one or more of the following block(s).

At block 32001, the process performs determining the first place based on a current location of a mobile device of the user, the location of the first place, and user reviews of the first place. In some embodiments, the process may use GPS or similar coordinates provided by the user's mobile device in order to identify places that are located nearby to the user's current location.

FIG. 3.21 is an example flow diagram of example logic illustrating an example embodiment of process 31900 of FIG. 3.19. More particularly, FIG. 3.21 illustrates a process 32100 that includes the process 31900, and which further includes operations performed by or at the following block(s).

At block 32101, the process performs ordering multiple possible places of interest based on a combination of a current location of a mobile device of the user, locations of the multiple places, and user reviews of the multiple places. In some embodiments, multiple places of interest may be sorted based on various factors including current location, locations of the places, user reviews, and the like. In this manner, the process may, for example, prioritize a nearby restaurant that serves food (e.g., Japanese food) that is related to the user's favorite food (e.g., Chinese food) over another restaurant that serves Chinese food but is further away.

FIG. 3.22 is an example flow diagram of example logic illustrating an example embodiment of process 31900 of FIG. 3.19. More particularly, FIG. 3.22 illustrates a process 32200 that includes the process 31900, wherein the determining a first place that is of interest to the user includes operations performed by or at one or more of the following block(s).

At block 32201, the process performs determining the first place without use of collaborative filtering. In some embodiments, the process does not use or rely on collaborative filtering or other techniques that are based on co-occurrence of places, items, or activities. In this manner, the process may be able to provide high-value results even though there may be insufficient data about place visits by a large population of users.

FIG. 3.23 is an example flow diagram of example logic illustrating an example embodiment of process 31900 of FIG. 3.19. More particularly, FIG. 3.23 illustrates a process 32300 that includes the process 31900, wherein the determining a first place that is of interest to the user includes operations performed by or at one or more of the following block(s).

At block 32301, the process performs determining the first place without associating the user with a category of users that represents aggregate properties of a group of users who are similar to the user. In some embodiments, the process does not assign the user to an aggregate category (e.g., 21-30 year-old male). Instead, the process may make its determinations based on the actual activities of the user him or herself.

FIG. 3.24 is an example flow diagram of example logic illustrating an example embodiment of process 31900 of FIG. 3.19. More particularly, FIG. 3.24 illustrates a process 32400 that includes the process 31900, and which further includes operations performed by or at the following block(s).

At block 32401, the process performs determining a user vector for each of multiple users, each user vector based on activities of a corresponding user, the activities including searches, click-throughs, location check-ins, explicit feedback, location tracking, and/or purchase information. The user vector may represent the user as a location in a multi-dimensional concept space, based on various user activities that indicate a level of interest in a particular place, item, or the like. For example, a search for a topic may indicate a (low) level of interest in the topic. A click-through on a search result may indicate a higher interest in a topic. Explicit feedback (e.g., a like or dislike or star rating) may indicate an even higher level of interest, while a physical visit or purchase may indicate the highest level of interest.

FIG. 3.25 is an example flow diagram of example logic illustrating an example embodiment of process 32400 of FIG. 3.24. More particularly, FIG. 3.25 illustrates a process 32500 that includes the process 32400, wherein the determining a user vector for each of multiple users includes operations performed by or at one or more of the following block(s).

At block 32501, the process performs updating the user vector corresponding to one of the multiple users in substantially real time, based on information received about recently occurring user activities and/or based on recency and/or frequency of activities performed by the one user. The user vector may be updated in or about real time, such as in response to indications of recently performed activities (e.g., credit card transactions, searches, check-ins). In addition, or in the alternative, elements or entries in the user vector may be adjusted (e.g., emphasized or decayed) based on the age of the activity and/or how frequently the activity occurs.

3. Example Computing System Implementation

Figure 4:
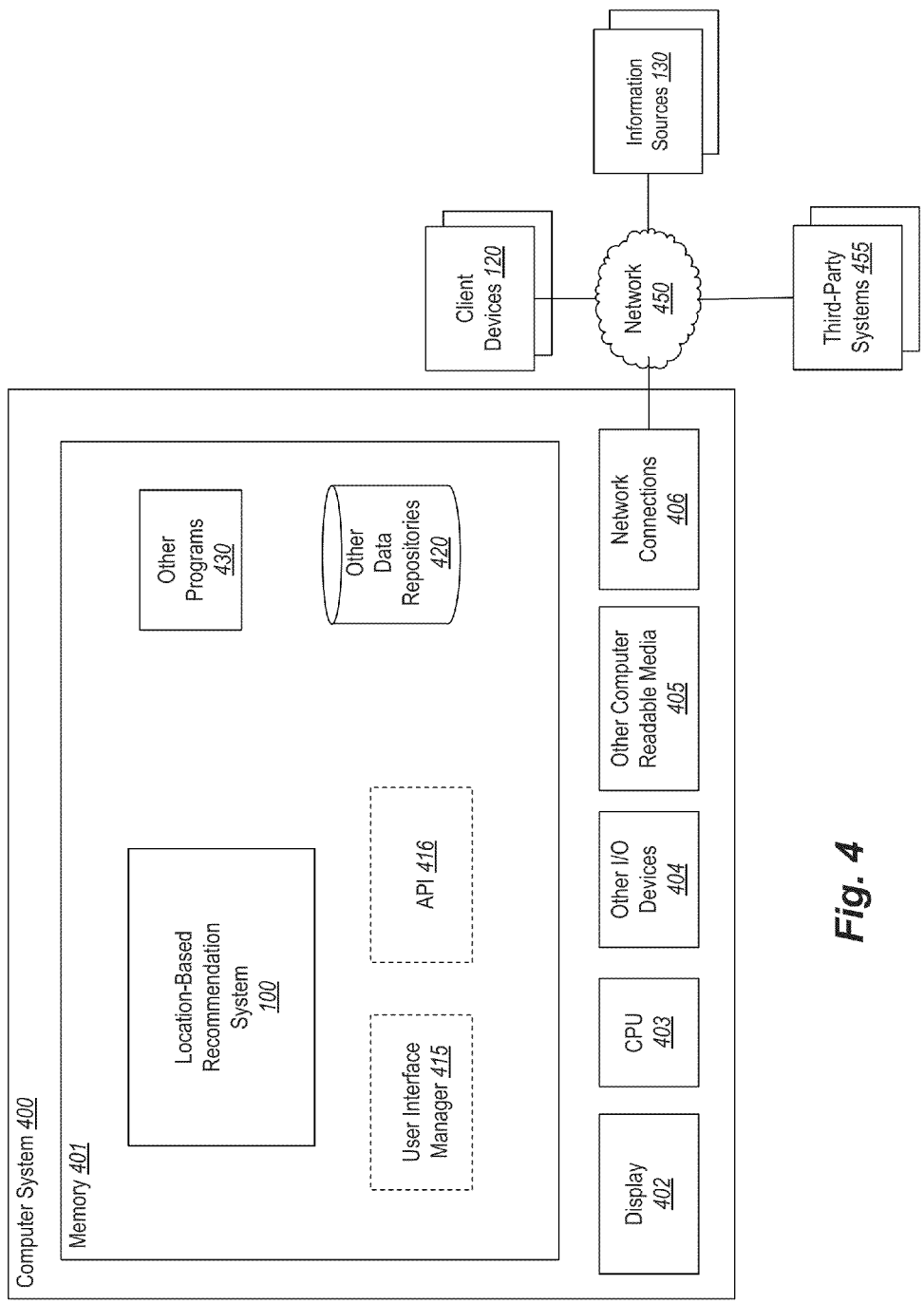
FIG. 4 is an example block diagram of an example computing system for implementing a location-based recommendation system according to an example embodiment.

FIG. 4 is an example block diagram of an example computing system for implementing a Location-Based Recommendation System according to an example embodiment. In particular, FIG. 4 shows a computing system 400 that may be utilized to implement an LBRS 100. Also, at least some of the implementation techniques described below with respect to the LBRS 100 may be used to implement other devices, systems, or modules described herein, including the client logic 122 of the client device 120.

Note that one or more general purpose or special purpose computing systems/devices may be used to implement the LBRS 100. In addition, the computing system 400 may comprise one or more distinct computing systems/devices and may span distributed locations. Furthermore, each block shown may represent one or more such blocks as appropriate to a specific embodiment or may be combined with other blocks. Also, the LBRS 100 may be implemented in software, hardware, firmware, or in some combination to achieve the capabilities described herein.

In the embodiment shown, computing system 400 comprises a computer memory ("memory") 401, a display 402, one or more Central Processing Units ("CPU") 403, Input/Output devices 404 (e.g., keyboard, mouse, CRT or LCD display, and the like), other computer-readable media 405, and network connections 406. The LBRS 100 is shown residing in memory 401. In other embodiments, some portion of the contents, some or all of the components of the LBRS 100 may be stored on and/or transmitted over the other computer-readable media 405. The components of the LBRS 100 preferably execute on one or more CPUs 403 and recommend content items, as described herein. Other code or programs 430 (e.g., an administrative interface, a Web server, and the like) and potentially other data repositories, such as data repository 420, also reside in the memory 401, and preferably execute on one or more CPUs 403. Of note, one or more of the components in FIG. 4 may not be present in any specific implementation. For example, some embodiments may not provide other computer readable media 405 or a display 402.

The LBRS 100 interacts via the network 450 with client devices 120, information sources 130, and third-party systems/applications 455. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 455 may include any systems that provide data to, or utilize data from, the LBRS 100, including Web browsers, e-commerce sites, calendar applications, email systems, social networking services, and the like.

The LBRS 100 is shown executing in the memory 401 of the computing system 400. Also included in the memory are a user interface manager 415 and an application program interface ("API") 416. The user interface manager 415 and the API 416 are drawn in dashed lines to indicate that in other embodiments, functions performed by one or more of these components may be performed externally to the LBRS 100.

The UI manager 415 provides a view and a controller that facilitate user interaction with the LBRS 100 and its various components. For example, the UI manager 415 may provide interactive access to the LBRS 100, such that users can interact with the LBRS 100, such as by submitting queries and receiving location-based recommendations in response. In some cases, users may configure the operation of the LBRS 100, such as by providing the LBRS 100 credentials to access various information sources, including social networking services, email systems, document stores, or the like. In some embodiments, access to the functionality of the UI manager 415 may be provided via a Web server, possibly executing as one of the other programs 430. In such embodiments, a user operating a Web browser executing on one of the client devices 120 can interact with the LBRS 100 via the UI manager 415.

The API 416 provides programmatic access to one or more functions of the LBRS 100. For example, the API 416 may provide a programmatic interface to one or more functions of the LBRS 100 that may be invoked by one of the other programs 430 or some other module. In this manner, the API 416 facilitates the development of third-party software, such as user interfaces, plug-ins, adapters (e.g., for integrating functions of the LBRS 100 into Web applications), and the like.

In addition, the API 416 may be in at least some embodiments invoked or otherwise accessed via remote entities, such as code executing on one of the client devices 120, information sources 130, and/or one of the third-party systems/applications 455, to access various functions of the LBRS 100. For example, an information source 130 may push location-related information (e.g., geo-location information, restaurant reviews, map information, address information) to the LBRS 100 via the API 416. The API 416 may also be configured to provide management widgets (e.g., code modules) that can be integrated into the third-party applications 455 and that are configured to interact with the LBRS 100 to make at least some of the described functionality available within the context of other applications (e.g., mobile apps).

In an example embodiment, components/modules of the LBRS 100 are implemented using standard programming techniques. For example, the LBRS 100 may be implemented as a "native" executable running on the CPU 403, along with one or more static or dynamic libraries. In other embodiments, the LBRS 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the LBRS 100, such as in the data stores 116 and/or 420, can be available by standard mechanisms such as through C, C++, C#, and Java APIs; libraries for accessing files, databases, or other data repositories; through scripting languages such as XML; or through Web servers, FTP servers, or other types of servers providing access to stored data. The data stores 116 and/or 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the LBRS 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. patent application No. 61/576,549, filed on Dec. 16, 2011 and entitled "LOCATION-BASED RECOMMENDATIONS," is incorporated herein by reference, in its entirety.

From the foregoing it will be appreciated that, although specific embodiments have been described herein for purposes of illustration, various modifications may be made without deviating from the spirit and scope of this disclosure. For example, the methods, techniques, and systems for location-based recommendation are applicable to other architectures or in other settings. For example, instead of providing recommendations to users of mobile devices, at least some of the techniques may be employed in desktop or kiosk environments, such as within trip planning systems, visitor information systems, or the like. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method comprising:
    providing, by a computer system comprising a processor, a location-based recommendation to a client device of a user, by electronically:
        receiving an indication of a first place, the indication received from the client device;
        determining a second place that is similar to the first place, based on properties of the first place and the second place that are derived from content items that describe the first place and the second place and based on a measure of similarity between a first concept vector associated with the first place and a second concept vector associated with the second place, the content items retrieved from a network, the first concept vector generated by analyzing terms and frequency of a first document that describes the first place and which is a result of aggregating documents and a first set of content items in the content items, the first set of content items about the first place, the first concept vector representing how strongly a first concept is expressed in or by the first place and the second concept vector generated by analyzing terms and frequency of a second document that describes the second place and which is a result of aggregating documents and a second set of content items in the content items, the second set of content items about the second place, the second concept vector representing how strongly a second concept is expressed in or by the second place; and
        providing an indication of the second place for display on the client device.

2. The method of claim 1, further comprising:
    aggregating multiple content items about the first place into a single content item;
    generating a term vector for the single content item; and
    generating the concept vector associated with the first place by determining, for each of multiple concepts, how similar the term vector for the single content item is to a term vector associated with the concept.

3. The method of claim 1, wherein the determining a second place that is similar to the first place includes determining the second place based on a measure of similarity between one or more structured attributes associated with the first place and the second place, the structured attributes including one or more of name, hours of operation, category, location, description, and/or payment policy.

4. The method of claim 1, wherein the determining a second place that is similar to the first place includes:
    determining multiple places based on a measure of similarity between concept vectors associated with the first place and each of the multiple places, wherein the second place is one of the multiple places; and
    ordering the multiple places based on a combination of distance between a current location of the client device of the user and locations of each of the multiple places, a measure of similarity between a concept vector associated with the first place and concept vectors associated with each of the multiple places, and a measure of similarity between structured attributes associated with the first place and structured attributes associated with the multiple places.

5. The method of claim 1, wherein the determining a second place that is similar to the first place includes:
    determining multiple places based on a measure of similarity between concept vectors associated with the first place and each of the multiple places, wherein the second place is one of the multiple places; and
    ordering the multiple places based on a combination of distance between a current location of the client device of the user and locations of each of the multiple places and a measure of similarity between a concept vector associated with each of the multiple places and a user vector associated with the user.

6. The method of claim 5, further comprising: determining a user vector for each of multiple users, each user vector based on activities of a corresponding user, the activities including searches, click-throughs, location check-ins, explicit feedback, location tracking, and/or purchase information.

7. The method of claim 5, wherein the receiving an indication of a first place includes: adjusting entries in the user vector associated with the user in substantially real time, based on recency and/or frequency of activities performed by the user.

8. The method of claim 1, wherein the first place and second place each operate under a corresponding brand, and wherein there exists no other place operating under the brand of the first place in a city or state in which the second place is located.

9. The method of claim 1, wherein the providing a location-based recommendation includes: providing a location-based recommendation without reference to any social networking information associated with the user.

10. The method of claim 1, wherein the second place is located in a different city or state than the first place.

11. The method of claim 1, further comprising: receiving a query that specifies the first place and requests one or more places that are similar to the first place, wherein the user is located in a city that includes the first place, wherein the query further specifies a city that is remote from a current city of the user, and wherein the second place is located in the remote city.

12. The method of claim 1, wherein the providing an indication of the second place includes: providing the indication of the second place as a cross-category recommendation, wherein the first place and the second place are in different service categories but are contextually related.

13. The method of claim 1, further comprising:
    identifying multiple places based on a corpus of content items; and
    deriving properties for each of the multiple locations based on the corpus of content items.

14. The method of claim 1, wherein the receiving an indication of a first place includes: receiving an indication of a place of business or leisure that is at least one of a restaurant, a retail establishment, a bar, a club, a venue, a cultural establishment, a recreational facility, a park, a hiking trail, a play field, and/or a location for a game.

15. The method of claim 1, wherein the determining a second place that is similar to the first place includes: determining the second place based on content items that include online reviews, directory listings, marketing information, and/or geo-location information.

16. The method of claim 1, wherein the providing a location-based recommendation includes:
    receiving a search query that specifies the first place; and
    providing an indication of the second place as part of search results determined based on the search query, the search results including multiple similar places ordered based on context vectors associated with each of the similar places.

17. The method of claim 1, further comprising:
receiving indications of multiple places one of which is the first place, the multiple places being places that have been visited by the user and/or identified as preferred places by the user;
determining a concept vector associated with the user based on concept vectors associated with the multiple places;
determining multiple similar places based on similarity between the concept vector associated with the user and concept vectors associated with the multiple similar places; and
providing indications of the multiple similar places as personalized recommendations to the user.

18. The method of claim 17, wherein the determining multiple similar places includes:
determining the multiple places further based on a current location of the user.

19. The method of claim 17, further comprising:
determining a feature of at least some of the multiple places that is preferred by the user; and
determining the multiple similar places further based on whether each of the multiple similar places has the determined feature.

20. The method of claim 1, further comprising:
determining weights associated with elements of concept vectors of each of multiple places, each weight indicating a significance of a corresponding concept vector element to a determination of similarity, wherein the first place and second place are some of the multiple places; and
determining that the second place is similar to the first place based on at least some of the determined weights.

21. A system comprising:
a processor;
a memory; and
a module that is stored in the memory and that is configured, when executed by the processor, to:
receive an indication of a first place, the indication received from a mobile device of a user;
determine a second place that is similar to the first place, based on concept vectors associated with the first place and the second place that are derived from content items that describe the first place and the second place, the content items retrieved from a network, and based on a measure of similarity between a first concept vector in the concept vectors that is associated with the first place and a second concept vector in the concept vectors that is associated with the second place, the first concept vector representing how strongly the content items are expressed in or by the first place and the second concept vector representing how strongly the content items are expressed in or by the second place; and
provide an indication of the second place for display on the mobile device.

22. The system of claim 21, wherein the memory is part of the mobile device, and the module is configured to:
transmit a request to a remote server system configured to determine similar places, the request including an indication of the first place;
receive the indication of the second place from the remote server system; and
display the received indication of the second place on a display of the mobile device.

23. The system of claim 21, wherein the memory is part of a search server, and the module is configured to:
receive a search request from the mobile device, the search request including the indication of the first place; and
transmit a search result including the indication of the second place to the mobile device.

24. A non-transitory computer-readable storage medium including contents that are configured, when executed, to cause a computing system to perform a method for determining similar places, the method comprising:
providing a location-based recommendation to a client device of a user, by electronically:
receiving an indication of a first place, the indication received from the client device;
determining multiple places that are similar to the first place, based on properties of the first place and the multiple places that are derived from content items that describe the first place and the multiple places and based on a measure of similarity between a first concept vector associated with the first place and a concept vector associated with each of the multiple places, the first concept vector generated by analyzing terms and frequence of a first document that describes the first place and which is a result of aggregating documents and a first set of content items in the content items, the first set of content items about the first place, the content items retrieved from a network;
ordering the multiple places, based on a combination of distance between a current location of a mobile device of the user and locations of each of the multiple places, on similarity between each of the multiple places and the first place, and on similarity between each of the multiple places and the user; and
providing an indication of the ordered multiple places for display on the client device.

* * * * *